United States Patent
Tamura et al.

(10) Patent No.: US 11,181,684 B2
(45) Date of Patent: Nov. 23, 2021

(54) OPTICAL FIBER

(71) Applicant: SUMITOMO ELECTRIC INDUSTRIES, LTD., Osaka (JP)

(72) Inventors: Yoshiaki Tamura, Osaka (JP); Hirotaka Sakuma, Osaka (JP); Keisei Morita, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/004,708

(22) Filed: Aug. 27, 2020

(65) Prior Publication Data

US 2020/0393613 A1      Dec. 17, 2020

Related U.S. Application Data

(63) Continuation of application No. PCT/JP2019/008459, filed on Mar. 4, 2019.

(30) Foreign Application Priority Data

Mar. 6, 2018   (JP) .............................. JP2018-039358

(51) Int. Cl.
  *G02B 6/02*  (2006.01)
  *G02B 6/04*  (2006.01)
  *G02B 6/036*  (2006.01)
  *G02B 1/04*  (2006.01)

(52) U.S. Cl.
  CPC ......... *G02B 6/02038* (2013.01); *G02B 1/046* (2013.01); *G02B 1/048* (2013.01); *G02B 6/03638* (2013.01)

(58) Field of Classification Search
  CPC .... G02B 6/02038; G02B 1/046; G02B 1/048; G02B 6/03638; G02B 6/03694; G02B 6/03627
  See application file for complete search history.

(56) References Cited

U.S. PATENT DOCUMENTS

| | | | |
|---|---|---|---|
| 4,199,337 A | 4/1980 | Asam | |
| 10,955,612 B2 * | 3/2021 | Watekar | ............... G01D 5/3537 |
| 2011/0085768 A1 | 4/2011 | Nakanishi et al. | |
| 2011/0211797 A1 | 9/2011 | Bennett et al. | |

(Continued)

FOREIGN PATENT DOCUMENTS

| | | |
|---|---|---|
| JP | 2006-058494 A | 3/2006 |
| JP | 2006-290710 A | 10/2006 |

(Continued)

*Primary Examiner* — John Bedtelyon
(74) *Attorney, Agent, or Firm* — Faegre Drinker Biddle & Reath LLP (57) ABSTRACT

An optical fiber is formed from silica glass, and includes a core, a first cladding which surrounds the core and has a refractive index lower than the refractive index of the core, and a second cladding which surrounds the first cladding and has a refractive index that is lower than the refractive index of the core and higher than the refractive index of the first cladding. The second cladding is divided into an inner region that is in contact with the first cladding and an outer region which surrounds the inner region and has a thickness that is half the thickness of the second cladding or less, while being 5 μm or more. The residual stress in at least a part of the outer region is a compressive stress.

20 Claims, 9 Drawing Sheets

(56) References Cited

U.S. PATENT DOCUMENTS

| | | |
|---|---|---|
| 2016/0131832 A1 | 5/2016 | Haruna et al. |
| 2016/0299289 A1 | 10/2016 | Bookbinder et al. |
| 2017/0003445 A1 | 1/2017 | Bookbinder et al. |
| 2018/0251397 A1 | 9/2018 | Yan et al. |

FOREIGN PATENT DOCUMENTS

| | | |
|---|---|---|
| JP | 2011-102964 A | 5/2011 |
| JP | 2013-521516 A | 6/2013 |
| JP | 2014-238526 A | 12/2014 |
| JP | 2017-027050 A | 2/2017 |
| WO | WO-2011/106585 A1 | 9/2011 |

* cited by examiner

OPTICAL FIBER

This is a continuation application of PCT/JP2019/008459 claiming the benefit of priority of the Japanese Patent Application No. 2018-039358 filed on Mar. 6, 2018, the entire contents of which are incorporated herein by reference.

TECHNICAL FIELD

The present disclosure relates to an optical fiber.

BACKGROUND ART

As a low-loss optical fiber made of silica glass, an optical fiber having a W-type refractive index structure is known. The optical fiber having the W-type refractive index structure includes a core, a first cladding which surrounds the core and has a refractive index lower than the refractive index of the core, and a second cladding which surrounds the first cladding and has a refractive index that is lower than the refractive index of the core and higher than refractive index of the first cladding. For example, the core is substantially free of Ge and the first cladding and the second claddings contain fluorine. Patent Literature 1 describes an optical fiber having the W-type refractive index structure.

CITATION LIST

Patent Literature

Patent Literature 1: Japanese Unexamined Patent Publication No. 2014-238526

SUMMARY OF INVENTION

An optical fiber of the present disclosure is formed from silica glass, and includes a core, a first cladding which surrounds the core and has a refractive index lower than the refractive index of the core, and a second cladding which surrounds the first cladding and has a refractive index that is lower than the refractive index of the core and higher than refractive index of the first cladding. The second cladding is divided into an inner region that is in contact with the first cladding and an outer region which surrounds the inner region and has a thickness that is half the thickness of the second cladding or less, while being 5 µm or more. The residual stress in at least a part of the outer region is a compressive stress, and the variation of the refractive index of the second cladding in the radial direction is 0.05% or less in terms of relative values with respect to the refractive index of pure silica glass.

DESCRIPTION OF EMBODIMENTS

[Problem Solve by Present Disclosure]
In the optical fiber having the W-type refractive index structure as described above, particularly in a case where the effective area is increased (for example, increased to 120 µm$^2$ or more), in order to reduce bending loss, it is necessary to make the relative refractive index difference of the first cladding lower than −0.25%, and in contrast, it is necessary to make the relative refractive index difference of the second cladding higher than −0.25% in order to adjust cutoff. For this reason, concentration of fluorine contained in the second cladding becomes extremely small.

Also in an optical fiber preform for manufacturing such an optical fiber by drawing, it is necessary to make the concentration of fluorine contained in a second cladding portion extremely low. In order to synthesize the second cladding portion made of silica glass containing fluorine of low concentration, in general, a glass soot body is sintered in $SiF_4$ gas of low concentration diluted with He gas or the like. However, since the $SiF_4$ of low concentration diffuses slowly into the glass soot body, transparent glass obtained by sintering the glass soot body often has a fluorine concentration distribution that becomes less dense toward the center. Therefore, as illustrated in FIG. 1, the refractive index of the inner region of the second cladding may be higher than the refractive index of the outer region of the second cladding (see Patent Literature 1).

Figure 1:
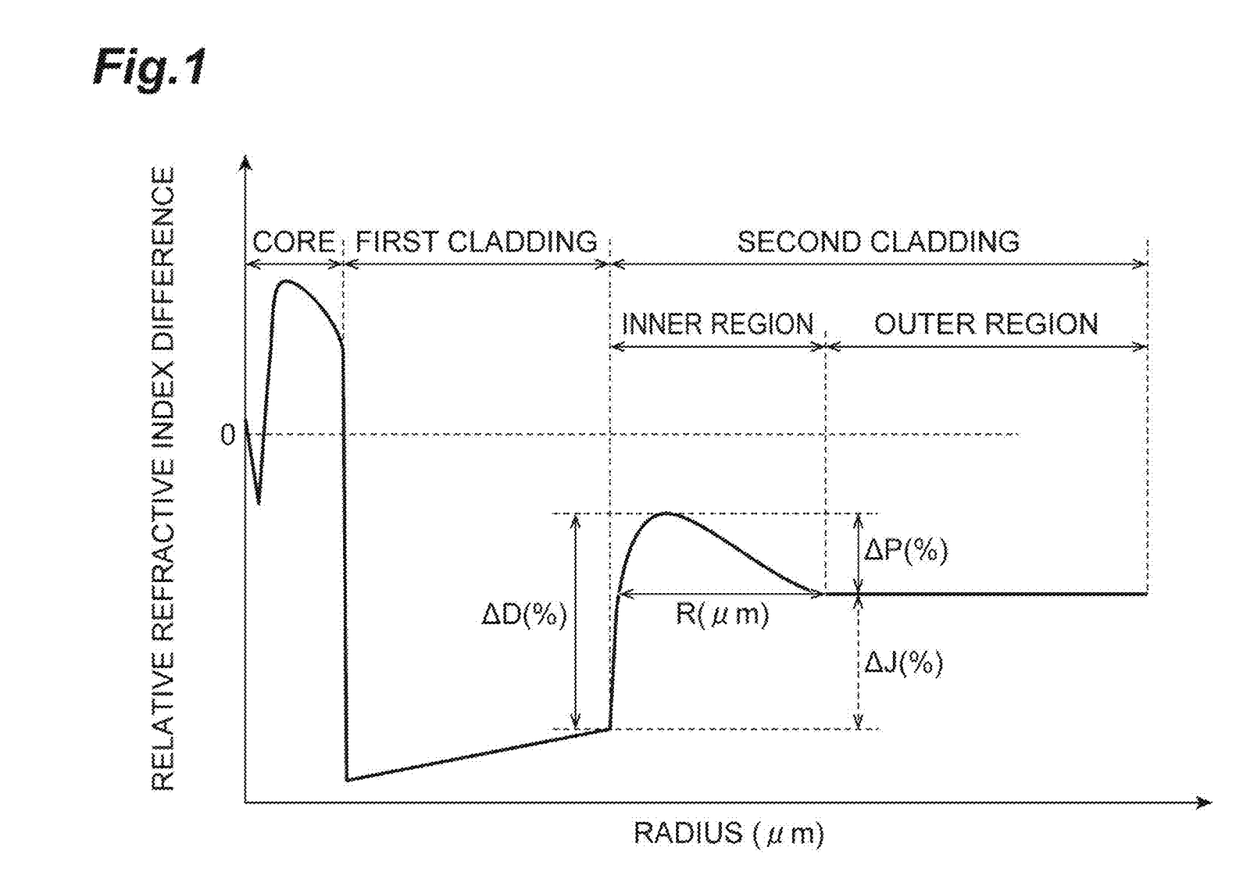
FIG. 1 is a diagram illustrating an example of a refractive index distribution in the radial direction of an optical fiber having a W-type refractive index structure.

FIG. 1 is a diagram illustrating an example of a refractive index distribution in the radial direction of an optical fiber having a W-type refractive index structure. The second cladding is divided into an inner region and an outer region. In this example, the refractive index of the outer region is substantially constant. The refractive index of the inner region is higher than the refractive index of the outer region. The parameters illustrated in FIG. 1 are as follows. R is the thickness of the inner region in the radial direction. ΔP is the difference between the maximum refractive index of the inner region and the refractive index of the outer region. ΔD is the difference between the maximum refractive index of the inner region and the refractive index of the first cladding (refractive index of a first cladding portion located at an interface with the second cladding portion). ΔJ is the difference between the refractive index of the first cladding portion located at the interface with the second cladding portion and the refractive index of the outer region. ΔD=ΔJ+ΔP is satisfied.

In such a refractive index distribution, a region having a higher refractive index in the inner region of the second cladding than that in the outer region is called a "bump" (refractive index bump). In a sintering time in which manufacturing is possible substantially, the difference between the minimum fluorine concentration in the inner region and the maximum fluorine concentration in the outer region is in the range of 1,000 atomic ppm to 2,000 atomic ppm. As a result, ΔP is within the range from 0.04% to 0.07%. Here, atomic ppm is the ratio of the number of atoms to be evaluated to 1 million $SiO_2$ units of glass.

Figure 2:
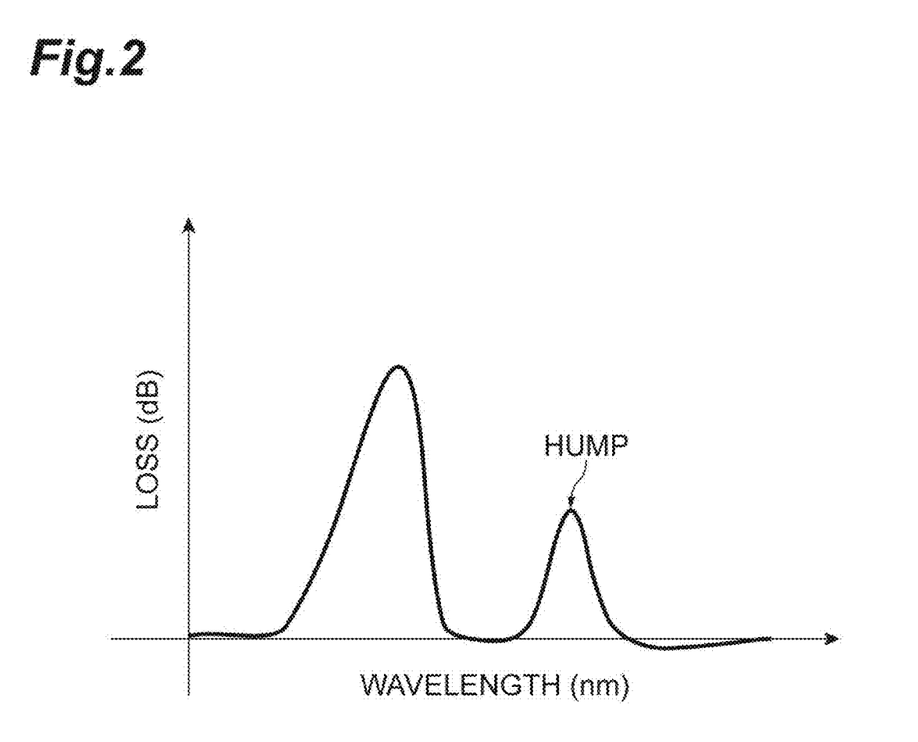
FIG. 2 is a diagram illustrating wavelength dependence of loss of the optical fiber.

As illustrated in FIG. 1, if the refractive index of the inner region of the second cladding becomes higher than the refractive index of the outer region of the second cladding, there are cases in which waves can be guided in a higher-order mode in which light is confined and propagated in the core and the inner region in addition to a fundamental mode in which light is mainly confined and propagated in the core. As a result, a waveform abnormality called a hump occurs at a cutoff wavelength, and the cutoff wavelength may become long (Recommendation ITU-T G.650.1 (July 2010), p. 24). FIG. 2 is a diagram illustrating wavelength dependence of loss of the optical fiber. As illustrated in FIG. 2, a peak (hump) whose intensity is weaker than the main peak of cutoff exists on the long wavelength side with respect to the main peak.

Furthermore, if the refractive index of the inner region of the second cladding is higher than the refractive index of the outer region of the second cladding, loss due to the higher-order mode may be generated and the loss may be increased when transmission loss is measured by cutback measurement.

As a method of suppressing bump formation, there is a method of making fluorine concentration uniform inside a glass soot body by holding the glass soot body for a long time at a low temperature of 1200° C. or less in a $SiF_4$ atmosphere of low concentration in order to promote diffusion of fluorine, and sintering the glass soot body while gradually raising the temperature thereof. However, this method takes time for manufacturing and has a problem of increasing costs.

As described above, it is difficult to manufacture an optical fiber having large effective area while suppressing occurrence of a bump of a refractive index.

The present disclosure has been made in order to solve the above problems, and an object of the present disclosure is to provide an optical fiber having a large effective area while suppressing occurrence of a bump of the refractive index.

Effects of Present Disclosure

According to the present disclosure, it is possible to provide an optical fiber having a large effective area while suppressing occurrence of a bump of the refractive index.

Description of Embodiments of Present Disclosure

First, the contents of the embodiment of the present disclosure will be listed and described. One aspect of the present disclosure relates to an optical fiber formed from silica glass. This optical fiber includes a core, a first cladding which surrounds the core and has a refractive index that is lower than the refractive index of the core, and a second cladding which surrounds the first cladding and has a refractive index that is lower than the refractive index of the core and higher than refractive index of the first cladding. The second cladding is divided into an inner region that is in contact with the first cladding and an outer region which surrounds the inner region and has a thickness that is half the thickness of the second cladding or less, while being 5 μm or more. The residual stress in at least a part of the outer region is a compressive stress, and the variation of the refractive index of the second cladding in the radial direction is 0.05% or less in terms of relative values with respect to the refractive index of pure silica glass.

In this optical fiber, it is preferable that the residual stress in at least a part of the inner region is a tensile stress, and the maximum value of the tensile stress in the inner region is larger than the maximum value of the tensile stress in the outer region. It is preferable that the maximum value of the tensile stress in the inner region is 30 MPa or more. It is preferable that the core is substantially free of Ge. In the present disclosure, "the core is substantially free of Ge" means that Ge concentration is less than 50 atomic ppm corresponding to the lower limit of detection by the EPMA method. It is preferable that the core contains an alkali metal element, and the average value of the concentration of the alkali metal element in the core is 1 atomic ppm or more and 100 atomic ppm or less.

In this optical fiber, it is preferable that the difference between the refractive index of the core and the refractive index of the first cladding is 0.25% or more in terms of relative values with respect to the refractive index of pure silica glass. It is preferable that bending loss at a wavelength of 1550 nm in the case of winding the optical fiber by 10 turns with the diameter of 50 mm is smaller than 0.1 dB. It is preferable that the effective area at a wavelength of 1550 nm is larger than 140 $\mu m^2$. It is preferable that the glass outer diameter is smaller than 125 μm and larger than 80 μm.

Details of Embodiment of Present Disclosure

Hereinafter, a mode for implementing an embodiment of the present disclosure will be described in detail with reference to the accompanying drawings. Note that in the description of the drawings, identical elements are denoted by identical reference signs, and overlapping descriptions are omitted. The present invention is not limited to these examples but is intended to be indicated by the claims and to include all modifications within the meaning and the scope of the claims and the equivalents thereof.

An optical fiber according to the present embodiment is formed from silica glass, and includes a core, a first cladding which surrounds the core and has a refractive index that is lower than the refractive index of the core, and a second cladding which surrounds the first cladding and has a refractive index that is lower than the refractive index of the core and higher than refractive index of the first cladding. The second cladding is divided into an inner region that is in contact with the first cladding and an outer region which surrounds the inner region and has a thickness that is half the thickness of the second cladding or less, while being 5 μm or more.

The residual stress in at least a part of the outer region is a compressive stress, and the variation of the refractive index of the second cladding in the radial direction is 0.05% or less in terms of relative values with respect to the refractive index of pure silica glass. It is preferable that the residual stress in at least a part of the inner region is a tensile stress. The maximum value of the tensile stress in the inner region is preferably larger than the maximum value of the tensile stress in the outer region. It is further preferable that the maximum value of the tensile stress (maximum residual stress) in the inner region is 30 MPa or more. It is preferable that the difference between the refractive index of the core and the refractive index of the first cladding is 0.25% or more in terms of relative values with respect to the refractive index of pure silica glass.

In the optical fiber according to the present embodiment, by appropriately setting the residual stress distribution in the radial direction after a drawing process, the refractive index change amount due to the fluorine concentration in the second cladding is offset by the refractive index change amount due to the residual stress. Therefore, the refractive index of the second cladding is made uniform. As a result, it is possible to provide an optical fiber having excellent transmission characteristics.

Figure 3:
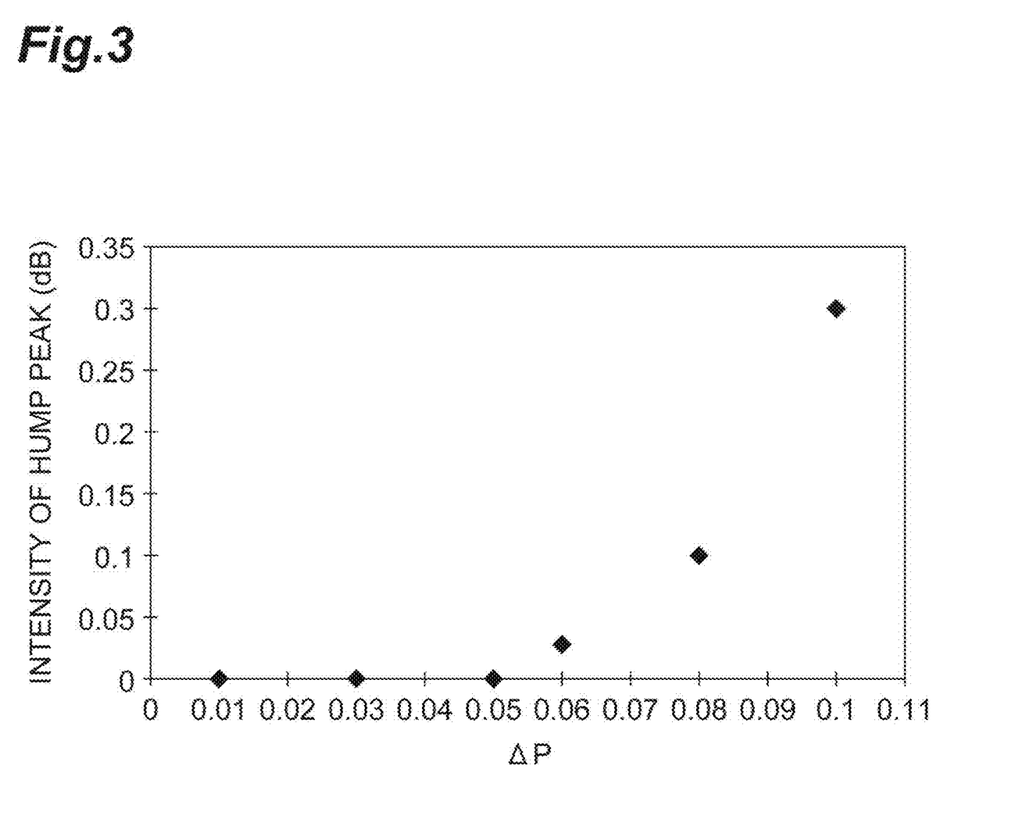
FIG. 3 is a graph illustrating the relationship between the difference ΔP between the maximum refractive index of an inner region and the refractive index of an outer region of a second cladding and intensity of a hump peak.

When the optical fiber is manufactured by drawing an optical fiber preform, the distribution in the radial direction of the stress remaining in the optical fiber is appropriately controlled. As a result, the residual stress in at least a part of the outer region of the second cladding is a compressive stress. In addition, the residual stress in at least a part of the inner region is a tensile stress. Due to the photoelastic effect caused by such a residual stress, the glass refractive index is increased or decreased, and the difference $\Delta P$ between the maximum refractive index of the inner region and the refractive index of the outer region of the second cladding can be reduced. The variation of the refractive index of the second cladding in the radial direction can be suppressed to 0.05% or less in terms of relative values with respect to the refractive index of pure silica glass. FIG. 3 is a graph illustrating the relationship between $\Delta P$ and intensity of a hump peak. As illustrated in FIG. 3, if $\Delta P$ is 0.05% or less, occurrence of a hump can be suppressed.

Figure 4A:
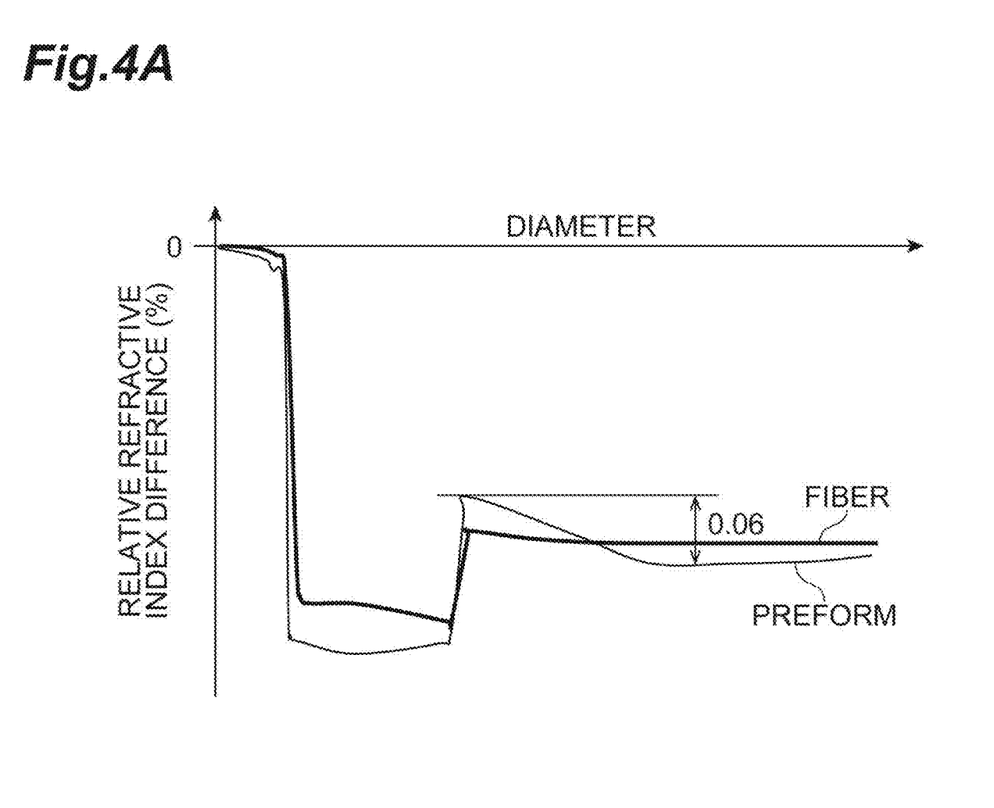
FIG. 4A is a diagram illustrating a refractive index distribution in the radial direction of each of an optical fiber preform and an optical fiber.
Figure 4B:
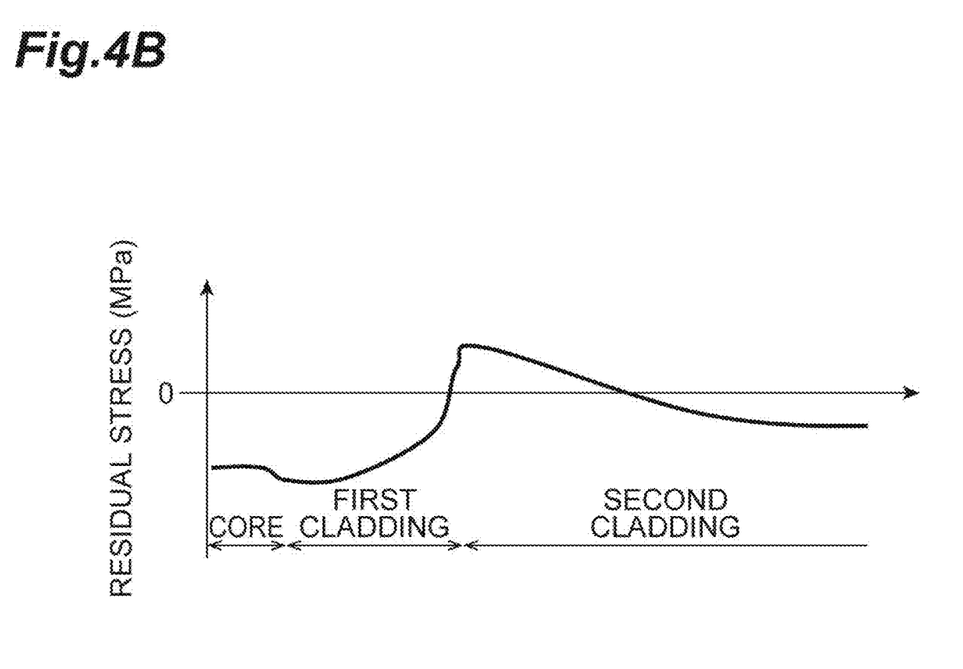
FIG. 4B is a diagram illustrating a residual stress distribution in the radial direction of the optical fiber.

FIG. 4A is a diagram illustrating a refractive index distribution in the radial direction of each of the optical fiber preform and the optical fiber. In FIG. 4A, the relative refractive index difference of the pure silica core in which the residual stress is negligible is set to 0%. $\Delta P=0.06\%$ is satisfied in the optical fiber preform, whereas $\Delta P=0.02\%$ is satisfied in the optical fiber manufactured by drawing this optical fiber preform. FIG. 4B is a diagram illustrating a residual stress distribution in the radial direction of the optical fiber. On the vertical axis of FIG. 4B, the positive direction indicates a tensile stress and the negative direction indicates a compressive stress.

As can be seen by comparing FIGS. 4A and 4B, the region where the relative refractive index difference of the optical fiber is lower than that of the optical fiber preform matches the region where the residual stress is a tensile stress. The region where the relative refractive index difference of the optical fiber is higher than that of the optical fiber preform matches the region where the residual stress is a compressive stress. Thus, the relative refractive index difference can be increased or decreased by the residual stress. By setting the residual stress in the inner region to a tensile stress, the relative refractive index difference in the inner region can be reduced. By setting the residual stress in the outer region to a compressive stress, the relative refractive index difference in the outer region can be increased. As a result, $\Delta P$ can be reduced.

Figure 5:
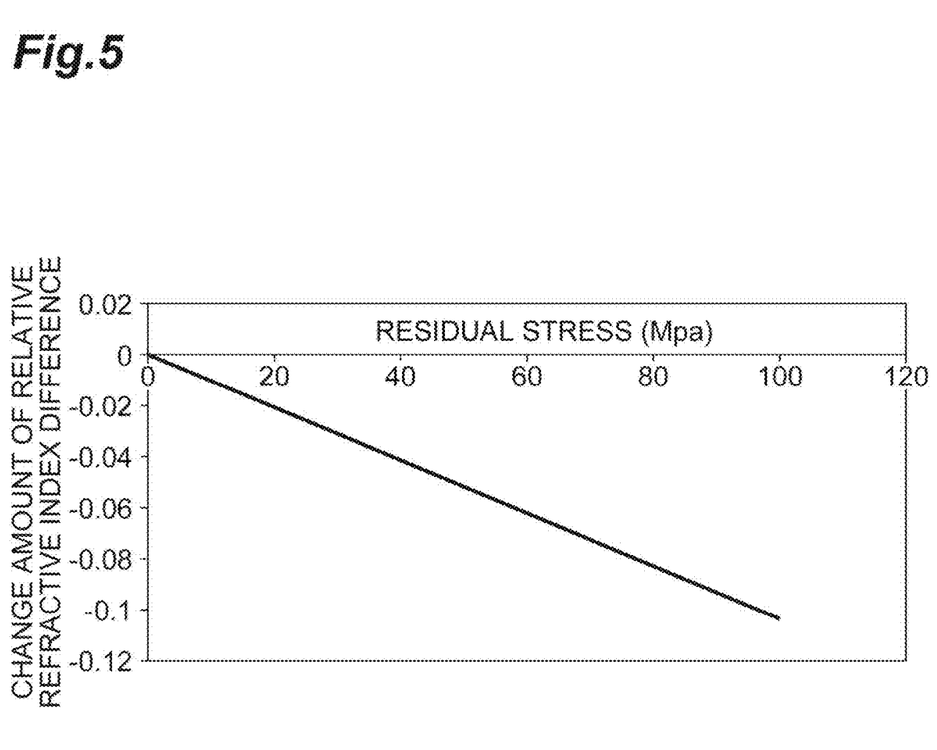
FIG. 5 is a graph illustrating the relationship between the residual stress (tensile stress) and the change amount of the relative refractive index difference in silica glass.

FIG. 5 is a graph illustrating the relationship between the residual stress (tensile stress) and the change amount of the relative refractive index difference in silica glass. As illustrated in FIG. 5, the greater the tensile stress is, the smaller the relative refractive index difference is. The amount of decrease in the relative refractive index difference is approximately proportional to the magnitude of the tensile stress.

In order to make the residual stress a tensile stress in a partial region of the second cladding of the optical fiber, it is necessary to make the residual stress a compressive stress in a wide region of the core and the first cladding of the optical fiber. In a case where a strong tensile stress remains in the core, a compressive stress remains in the cladding relatively, so that it is difficult to cause the tensile stress to be remained in the second cladding. Therefore, it is desirable to add an element that reduces the viscosity of silica glass, such as Ge, an alkali metal element, or an alkaline earth metal element to the core. Here, examples of the alkali metal element or the alkaline earth metal element include Na, K, Rb, Cs, Be, Mg and Ca.

Adding Ge to the core is suitable for controlling the residual stress; however, it is necessary to set the Ge concentration to 0.5% or more. Therefore, there is a risk that scattering loss due to Ge concentration fluctuation caused by addition of Ge of high concentration will occur. In contrast, the core that is substantially free of Ge and contains an alkali metal element is excellent in that the optical fiber with low loss can be obtained since the residual stress of the core can be sufficiently reduced even at low concentration of 100 atomic ppm or less. The average value of the concentration of the alkali metal element in the core is preferably 1 atomic ppm or more and 100 atomic ppm or less.

However, as it is considered possible to apply a tensile stress to the inner region of the second cladding also by a method of, for example, adding halogens such as fluorine, chlorine, or the like of different concentrations and forming a complex cladding structure with three or more layers to form a highly viscous region in a part of a cladding. Therefore, an additive to the core is not always necessary.

In contrast, in a case where the relative refractive index difference in the outer region with respect to the inner region of the second cladding is greater than 0.05%, the loss of the optical fiber increases in a case of bending with a diameter smaller than 50 mm. Therefore, it cannot be said that the lower the relative refractive index difference in the inner region of the second cladding, the better. It can be said that it is most preferable that the fluctuation of the relative refractive index difference within the second cladding is small.

Figure 6:
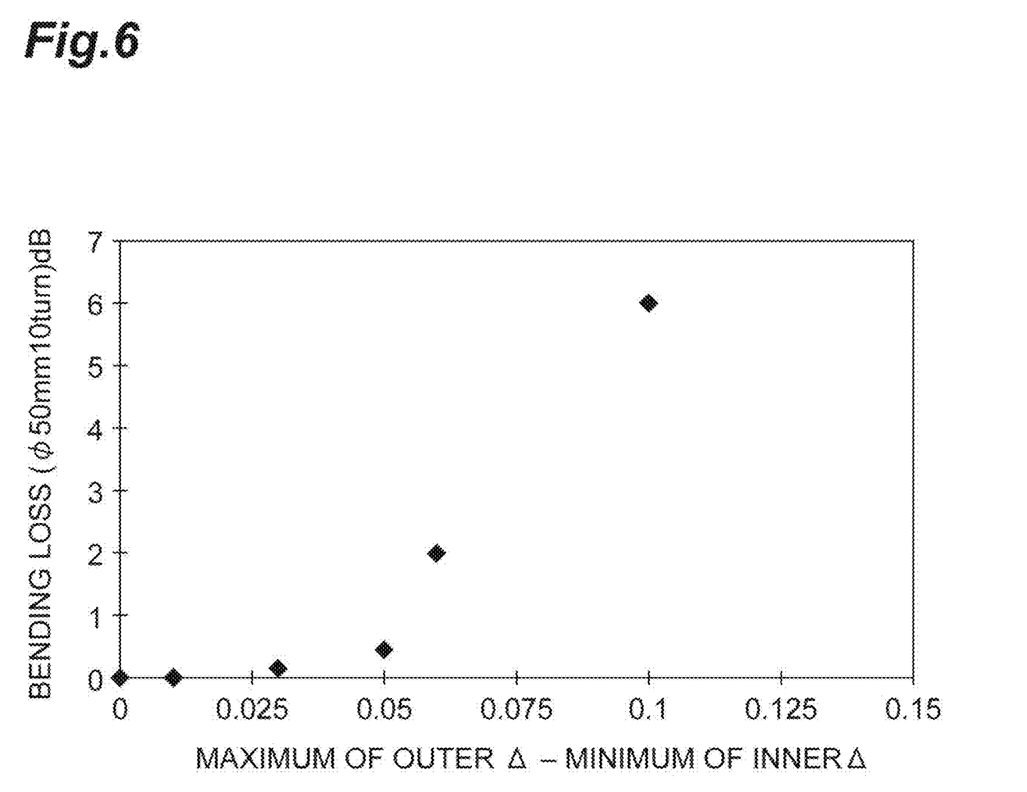
FIG. 6 is a graph illustrating the relationship between the difference between the maximum refractive index of an outer region and the minimum refractive index of an inner region of the second cladding and bending loss at a wavelength of 1550 nm.

FIG. 6 is a graph illustrating the relationship between the difference between the maximum refractive index of the outer region and the minimum refractive index of the inner region of the second cladding and bending loss at a wavelength of 1550 nm. The bending loss is the difference between the loss that occurs when the optical fiber is wound on a mandrel having a diameter of 50 mm by 10 turns and the loss that occurs when the bending is released. As illustrated in FIG. 6, if the maximum refractive index of the outer region is greater than the minimum refractive index of the inner region by a relative refractive index difference of more than 0.05%, the bending loss sharply deteriorates. That is, it is preferable that variation of the refractive index of the second cladding in the radial direction is 0.05% or less in terms of relative values with respect to the refractive index of pure silica glass.

In a case where a compressive stress is generated in the outer region of the second cladding in the optical fiber in which an element that reduces viscosity is added to the core, a compressive stress is generated in the core, the first cladding, and the outer region of the second cladding. Therefore, drawing tension is applied only to the inner region of the second cladding in the drawing process. The residual stress at this time depends on the tension per unit area, which is a value obtained by dividing the pulling tension of the optical fiber by the area on which the tension is applied. In a case where the second cladding is thin and the glass outer diameter is smaller than 125 μm, a stronger tensile stress can be applied to the inner region. Therefore, a bump can be efficiently made small.

In the optical fiber according to the present embodiment, the bending loss at a wavelength of 1550 nm in the case of winding the optical fiber by 10 turns with a diameter of 50 mm is smaller than 0.1 dB. The effective area at the wavelength of 1550 nm is larger than 140 µm². Moreover, the glass outer diameter is smaller than 125 µm and larger than 80 µm.

Figure 7:
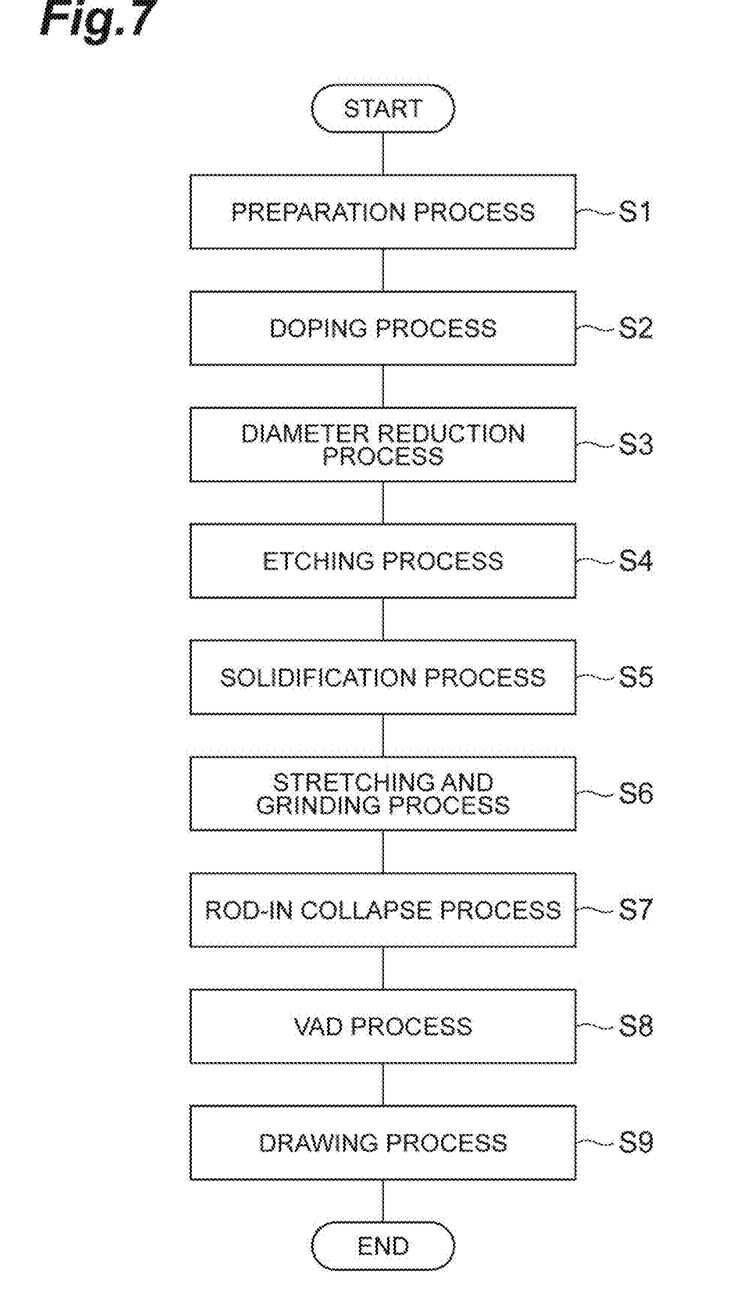
FIG. 7 is a flowchart explaining a method of manufacturing the optical fiber.

Next, an example of a method of manufacturing the optical fiber according to the present embodiment will be described. FIG. 7 is a flowchart explaining a method of manufacturing the optical fiber. In the method of manufacturing the optical fiber of the present embodiment, a preparation process (step S1), an doping process (step S2), a diameter reduction process (step S3), an etching process (step S4), a solidification process (step S5), a stretching and grinding process (step S6), a rod-in collapse process (step S7), a VAD process (step S8), and a drawing process (step S9) are sequentially performed to manufacture the optical fiber. Note that although an example of manufacturing conditions is described in the following description, the present invention is not limited to this.

In the preparation process (step S1), a quartz-based glass pipe in which an alkali metal element is to be diffused is prepared. This quartz-based glass pipe contains 100 atomic ppm of chlorine (Cl) and 6,000 atomic ppm of fluorine (F), and the concentration of other dopants and impurities is 10 mol ppm or less. The quartz-based glass pipe has an outer diameter of 35 mm and an inner diameter of about 20 mm.

In the doping process (step S2), potassium (K) as an alkali metal element is added to the inner surface of the quartz-based glass pipe. Potassium bromide (KBr) is used as raw material. KBr vapor is generated by heating KBr to a temperature of 840° C. with an external heat source. While introducing the KBr vapor into the quartz-based glass pipe together with a carrier gas obtained by introducing oxygen at a flow rate of 1 SLM (1 liter/min when converted to the standard state), the quartz-based glass pipe is heated by an oxyhydrogen burner from the outside so that the temperature of the outer surface of the quartz-based glass pipe is 2150° C. At this time, the burner is traversed at a speed of 40 mm/min to heat the quartz-based glass pipe for a total of 15 turns, and the potassium metal element is diffused and added to the inner surface of the quartz-based glass pipe. The maximum value of concentration of potassium in this alkali metal-added pipe is 1,000 atomic ppm.

In the diameter reduction process (step S3), the diameter of the quartz-based glass pipe to which potassium is added is reduced. At this time, while flowing 0.5 SLM of oxygen to the inside of the quartz-based glass pipe, the quartz-based glass pipe is heated by the external heat source so that the temperature of the outer surface of the quartz-based glass pipe is 2250° C. Heating is performed in a total of six turns by traversing the external heat source, and the quartz glass pipe to which potassium is added is reduced in diameter until the inner diameter becomes 5 mm.

In the etching process (step S4), the inner surface of the quartz-based glass pipe is etched. At this time, while introducing a mixed gas of $SF_6$ (0.2 SLM) and chlorine (0.5 SLM) into the quartz glass pipe, the quartz glass pipe is heated by the external heat source to perform vapor phase etching. As a result, the inner surface of the pipe containing a high concentration of impurities doped together with the alkali metal element can be shaved, and the impurities can be removed.

In the solidification process (step S5), the quartz-based glass pipe is solidified. In the solidification process, a mixed gas of oxygen (0.1 SLM) and He (1 SLM) is introduced into the quartz glass pipe, and the surface temperature is set to 2150° C. while reducing the absolute pressure in the quartz glass pipe to 97 kPa or less to solidify the quartz glass pipe. By this solidification process, a core rod containing the alkali metal element (outer diameter 25 mm) is obtained. The size of the core material may be increased by applying other glass around the core rod by a known method such as a collapse method.

In the stretching and grinding process (step S6), the core rod is stretched until the outer diameter becomes 23 mm, and then the outer periphery of the core rod is ground until the outer diameter becomes 17 mm. Thus, the outer diameter of the core rod is adjusted so that the ratio of the outer diameter to the inner diameter of a pipe to be used in the subsequent rod-in collapse process is three times or more and four times or less.

In the rod-in collapse process (step S7), a cladding portion is provided outside the core rod (core portion). At this time, a rod-in collapse method is used in which the core portion is inserted inside the quartz-based glass pipe (first cladding portion) to which fluorine is added, and the both are heated by the external heat source and are integrated. The relative refractive index difference between the core portion and the first cladding portion is about 0.34% in maximum. As a result of the synthesis by the rod-in collapse method, it is possible to suppress the amount of water in the core portion and the cladding portion in the vicinity thereof to be sufficiently low.

In the VAD process (step S8), the rod in which the core portion and the cladding portion are integrated is stretched to have a predetermined diameter, and then the second cladding portion is synthesized on the outside of the rod by a VAD (vapor phase axial deposition) method. Then, after fluorine is added in a $SiF_4$ gas at a temperature of 900° C. to 1200° C., the temperature is raised to 1500° C. or more to perform vitrification. Thus, an optical fiber preform is manufactured. In the obtained optical fiber preform, the outer diameter of the first cladding portion is 30 mm and the outer diameter of the second cladding portion is 120 mm. If the relative refractive index difference is measured to measure the refractive index structure in the preform state, $\Delta P$ is 0.07%.

In the subsequent drawing process (step S9), an optical fiber is manufactured by drawing the optical fiber preform manufactured by the above-described method of manufacturing the optical fiber preform. The drawing speed is 100 m/min and the drawing tension is 0.5N. Furthermore, an annealing furnace provided below a drawing furnace for drawing the optical fiber reheats the optical fiber. At this time, a space is provided between the drawing furnace and the annealing furnace. The space has a length of 50 cm or more and 1 m or less. This length is a value optimized by the relationship between the drawing speed and the optical fiber temperature. It is suitable that the temperature of the optical fiber before entering the annealing furnace is set to 1000° C. or more and 1200° C. or less so that the optical fiber is cooled to the glass transition temperature or less. Furthermore, since it is necessary to heat the optical fiber for one second or more in order to melt the outside of the optical fiber and make the stress a compressive stress, the drawing speed and the length of the annealing furnace are adjusted so that the annealing time is sufficient.

Figure 8:
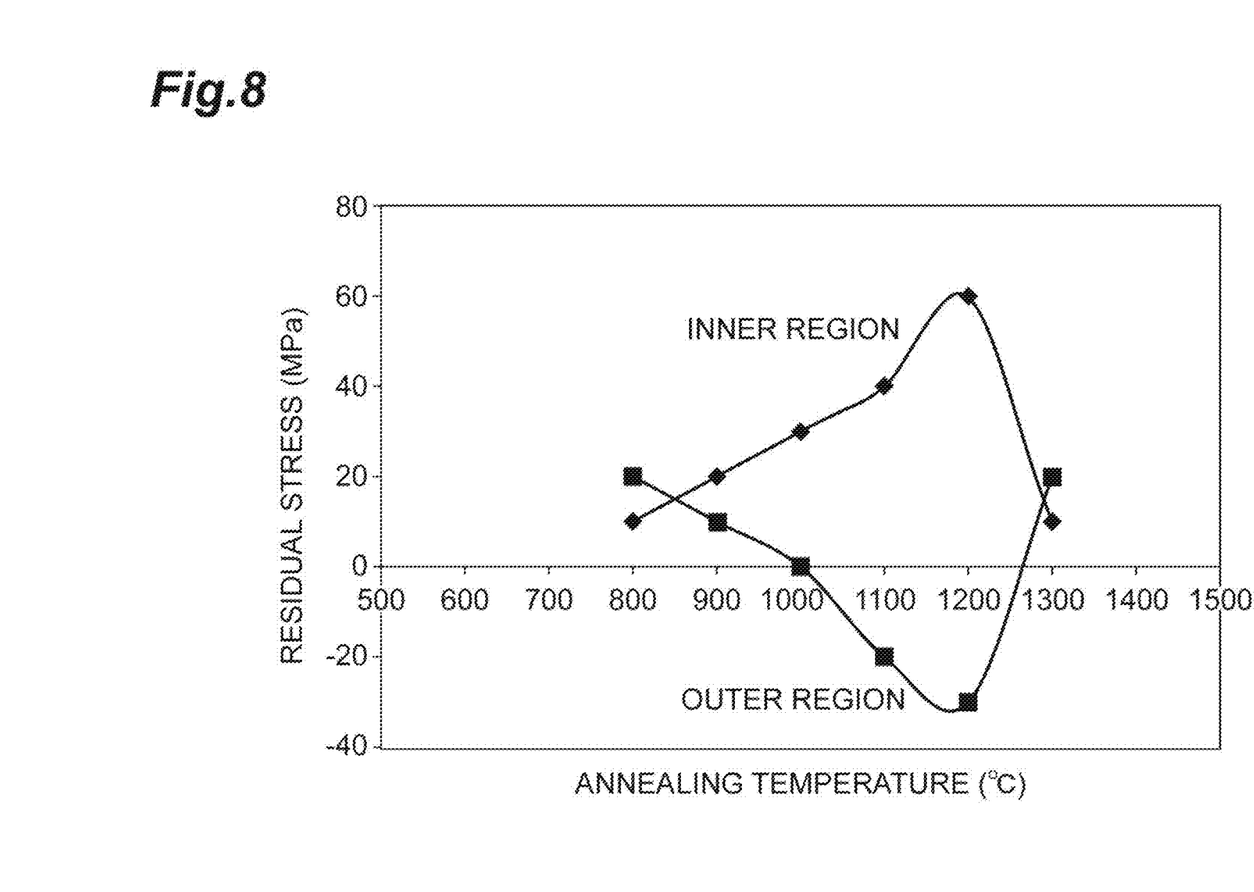
FIG. 8 is a graph illustrating the relationship between the temperature of an annealing furnace and the magnitude of a residual stress.

FIG. 8 is a graph illustrating the relationship between the temperature of the annealing furnace and the magnitude of the residual stress. FIG. 8 illustrates the annealing temperature dependence of the minimum residual stress in the outer region of the second cladding and the annealing temperature dependence of the maximum residual stress in the inner region of the second cladding. In a case where the temperature of the annealing furnace is lower than 1000° C., it is presumed that since the optical fiber glass does not melt, the stress is determined when the optical fiber comes out of the drawing furnace to be solidified by cooling and there is little difference in residual stress in the radial direction in the second cladding. In contrast, in a case where the temperature of the annealing furnace is higher than 1200° C., it is presumed that the entire second cladding melts and the difference in stress in the second cladding is less likely to occur. If the temperature of the annealing furnace is set to 1000° C. or more and 1270° C. or less so that the minimum residual stress in the outer region of the second cladding becomes a negative value (that is, a compressive stress remains in a part of the outer region of the second cladding), the maximum residual stress in the inner region of the second cladding is 30 MPa or more. As a result, it is possible to compensate for the relative refractive index difference of 0.005% due to non-uniformity of the fluorine concentration.

Examples of the characteristics of the optical fiber manufactured were as follows. The transmission loss at a wavelength of 1550 nm was 0.142 dB/km. The transmission loss at a wavelength of 1380 nm was 0.4 dB/km. The effective area at a wavelength of 1550 nm was 150 $\mu m^2$. The bending loss at a wavelength of 1550 nm was 0.15 dB when the optical fiber was wound by 10 turns with a diameter of 50 mm. ΔP was 0.02%. In addition, the residual stress in the outer region of the second cladding was a compressive stress.

As a comparative example, in the drawing process (step S9), the optical fiber that has come out from the drawing furnace was cooled without being reheated by the annealing furnace. The characteristics of the optical fiber of the comparative example manufactured in this manner were as follows. The distribution in which the residual stress is higher toward the outside of the outermost layer is obtained. As a result, ΔP was 0.07%, and ΔP was greater in the fiber state than in the preform state. In this optical fiber, a hump occurred at cutoff, and accurate measurement could not be performed. In addition, the transmission loss at 1550 nm increased slightly to 0.145 dB/km due to the loss estimated to be caused by the influence of the higher-order mode.

As described above, in the present embodiment, by appropriately setting the residual stress distribution in the radial direction after the drawing process and offsetting the refractive index change amount due to the fluorine concentration in the second cladding by the refractive index change amount due to the residual stress, the refractive index of the second cladding is made uniform. As a result, it is possible to provide an optical fiber having a large effective area while suppressing an occurrence of a bump of the refractive index.

The invention claimed is:

1. An optical fiber formed from silica glass, the optical fiber comprising:
a core, a first cladding surrounding the core and having a refractive index lower than a refractive index of the core, and a second cladding surrounding the first cladding and having a refractive index that is lower than the refractive index of the core and higher than refractive index of the first cladding, wherein
the second cladding is divided into an inner region that is in contact with the first cladding and an outer region which surrounds the inner region and has a thickness that is half a thickness of the second cladding or less, while being 5 μm or more,
a residual stress in at least a part of the outer region is a compressive stress, and
a variation of the refractive index of the second cladding in a radial direction is 0.05% or less in terms of relative values with respect to a refractive index of pure silica glass.

2. The optical fiber according to claim 1, wherein
a residual stress in at least a part of the inner region is a tensile stress, and
a maximum value of the tensile stress in the inner region is greater than a maximum value of a tensile stress in the outer region.

3. The optical fiber according to claim 2, wherein
the maximum value of the tensile stress in the inner region is 30 MPa or more.

4. The optical fiber according to claim 3, wherein
the core is substantially free of Ge.

5. The optical fiber according to claim 3, wherein
the core contains an alkali metal element, and
an average value of a concentration of the alkali metal element in the core is 1 atomic ppm or more and 100 atomic ppm or less.

6. The optical fiber according to claim 3, wherein
a difference between the refractive index of the core and the refractive index of the first cladding is 0.25% or more in terms of relative values with respect to the refractive index of the pure silica glass.

7. The optical fiber according to claim 3, wherein
a bending loss of the optical fiber deployed at a diameter of 50 mm is smaller than 0.1 dB per 10 turns at a wavelength of 1550 nm.

8. The optical fiber according to claim 2, wherein
the core is substantially free of Ge.

9. The optical fiber according to claim 2, wherein
the core contains an alkali metal element, and
an average value of a concentration of the alkali metal element in the core is 1 atomic ppm or more and 100 atomic ppm or less.

10. The optical fiber according to claim 2, wherein
a difference between the refractive index of the core and the refractive index of the first cladding is 0.25% or more in terms of relative values with respect to the refractive index of the pure silica glass.

11. The optical fiber according to claim 2, wherein
a bending loss of the optical fiber deployed at a diameter of 50 mm is smaller than 0.1 dB per 10 turns at a wavelength of 1550 nm.

12. The optical fiber according to claim 1, wherein
the core is substantially free of Ge.

13. The optical fiber according to claim 12, wherein
the core contains an alkali metal element, and
an average value of a concentration of the alkali metal element in the core is 1 atomic ppm or more and 100 atomic ppm or less.

14. The optical fiber according to claim 12, wherein
a difference between the refractive index of the core and the refractive index of the first cladding is 0.25% or more in terms of relative values with respect to the refractive index of the pure silica glass.

15. The optical fiber according to claim 1, wherein
the core contains an alkali metal element, and
an average value of a concentration of the alkali metal element in the core is 1 atomic ppm or more and 100 atomic ppm or less.

16. The optical fiber according to claim 15, wherein
a difference between the refractive index of the core and the refractive index of the first cladding is 0.25% or more in terms of relative values with respect to the refractive index of the pure silica glass.

17. The optical fiber according to claim 1, wherein a difference between the refractive index of the core and the refractive index of the first cladding is 0.25% or more in terms of relative values with respect to the refractive index of the pure silica glass.

18. The optical fiber according to claim 1, wherein a bending loss of the optical fiber deployed at a diameter of 50 mm is smaller than 0.1 dB per 10 turns at a wavelength of 1550 nm.

19. The optical fiber according to claim 1, wherein the optical fiber has an effective area larger than 140 μm$^2$ at a wavelength of 1550 nm.

20. The optical fiber according to claim 1, wherein an outer diameter of the second cladding is smaller than 125 μm and larger than 80 μm.

* * * * *